(12) United States Patent
McNair

(10) Patent No.: US 7,048,037 B2
(45) Date of Patent: May 23, 2006

(54) GEOTHERMAL HEATING AND/OR COOLING APPARATUS AND METHOD OF USING SAME

(76) Inventor: Edward F. McNair, 3147 R Ave., Adel, IA (US) 50003

( * ) Notice: Subject to any disclaimer, the term of this patent is extended or adjusted under 35 U.S.C. 154(b) by 30 days.

(21) Appl. No.: 10/730,867

(22) Filed: Dec. 9, 2003

(65) Prior Publication Data

US 2005/0121169 A1 Jun. 9, 2005

(51) Int. Cl.
*F28D 1/00* (2006.01)
(52) U.S. Cl. .......................... 165/45; 165/172
(58) Field of Classification Search ................. 165/45, 165/172–176
See application file for complete search history.

(56) References Cited

U.S. PATENT DOCUMENTS

| | | | | |
|---|---|---|---|---|
| 3,648,768 A | * | 3/1972 | Scholl | 165/171 |
| 4,062,489 A | | 12/1977 | Henderson | |
| 4,269,172 A | * | 5/1981 | Parker et al. | 126/621 |
| 4,279,291 A | * | 7/1981 | Lambert | 165/45 |
| 4,448,237 A | * | 5/1984 | Riley | 165/45 |
| 4,448,238 A | | 5/1984 | Singleton | |
| 4,510,920 A | * | 4/1985 | Walmet | 126/561 |
| 4,832,119 A | * | 5/1989 | Bloor et al. | 165/171 |
| 4,867,229 A | * | 9/1989 | Mogensen | 165/45 |
| 4,941,773 A | | 7/1990 | Vergouw | |
| 5,109,932 A | | 5/1992 | Bueter | |
| 5,161,626 A | | 11/1992 | Laffkas | |
| 5,329,992 A | * | 7/1994 | Tripp | 165/45 |
| 5,372,016 A | * | 12/1994 | Rawlings | 165/45 |
| 5,561,985 A | * | 10/1996 | Cochran | 165/45 |
| 5,642,964 A | * | 7/1997 | DeMasters | 405/184.4 |
| 5,758,724 A | | 6/1998 | Amerman | |
| 6,000,459 A | | 12/1999 | Jeppesen | |
| 6,041,862 A | * | 3/2000 | Amerman | 166/290 |
| 6,585,036 B1 | | 7/2003 | Amerman | |
| 2003/0094264 A1 | * | 5/2003 | Bergevin | 165/133 |

OTHER PUBLICATIONS

COPY -3 sheets entitled Geothermal Bore Technologies, Inc.—Basic Objective of the GeoClip™, dated Sep. 10, 2002.
COPY—1 sheet (color) showing a TriAction Reamer/Operational—sheet from a website dated Nov. 5, 2003.
Copy—1 sheet showing a Plug Style Innerduct Puller, undated.

* cited by examiner

*Primary Examiner*—Teresa J. Walberg
(74) *Attorney, Agent, or Firm*—Sturm & Fix LLP

(57) ABSTRACT

A geothermal apparatus comprising a first pipe for receiving a heat exchange liquid therein and a second pipe for receiving the heat exchange liquid therein and having a web integrally connected to each of the first and second pipes, between such pipes for holding the second pipe at a predetermined distance from the first pipe. This pair of pipes, which are integrally connected, are installed in the ground in a hole or bore and then are connected to a heat exchanger having a fluid inlet connected to one of the pipes, a fluid outlet connected to the other of the pipes and the end of the pipes remote from the heat exchanger which are connected together.

14 Claims, 4 Drawing Sheets

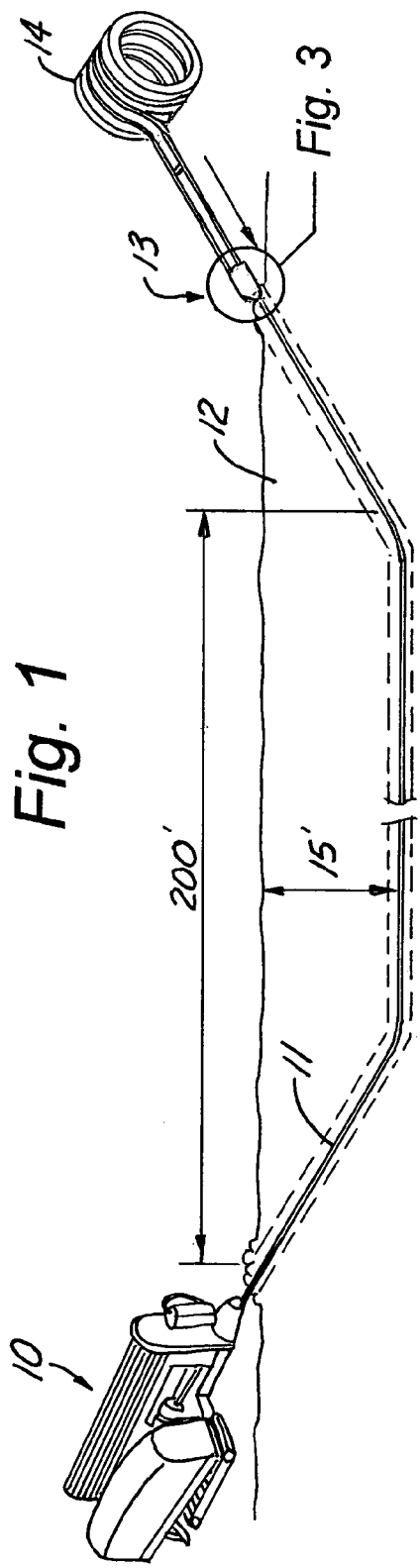
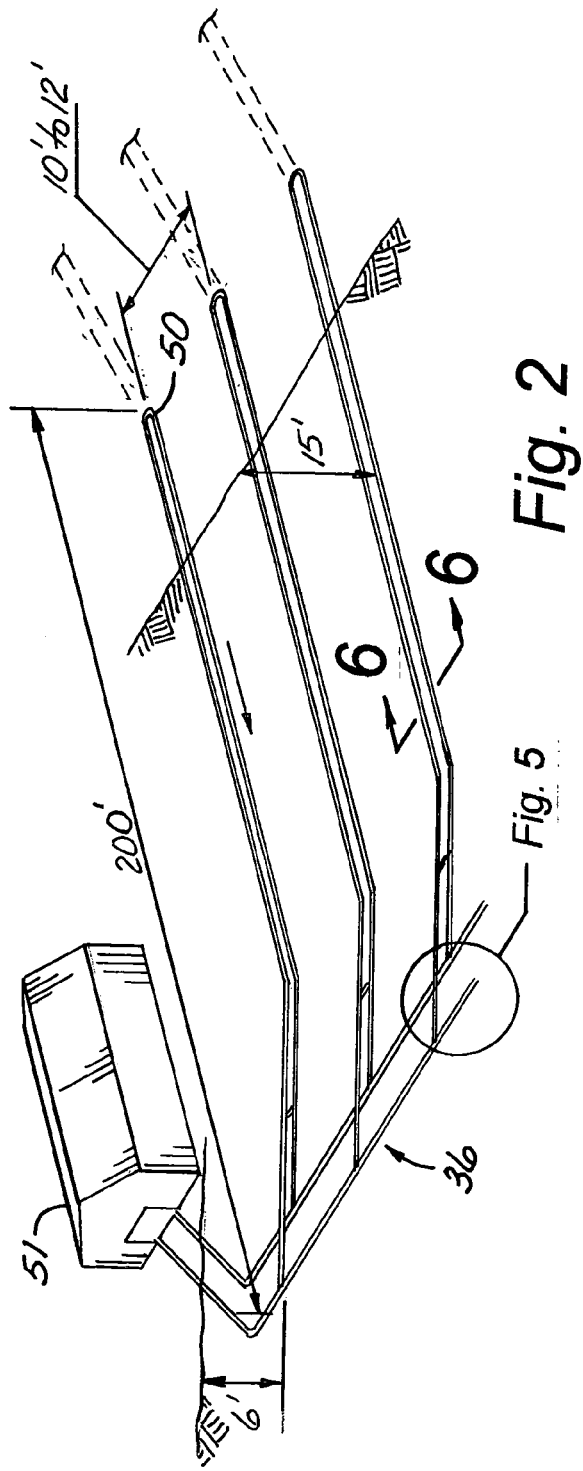

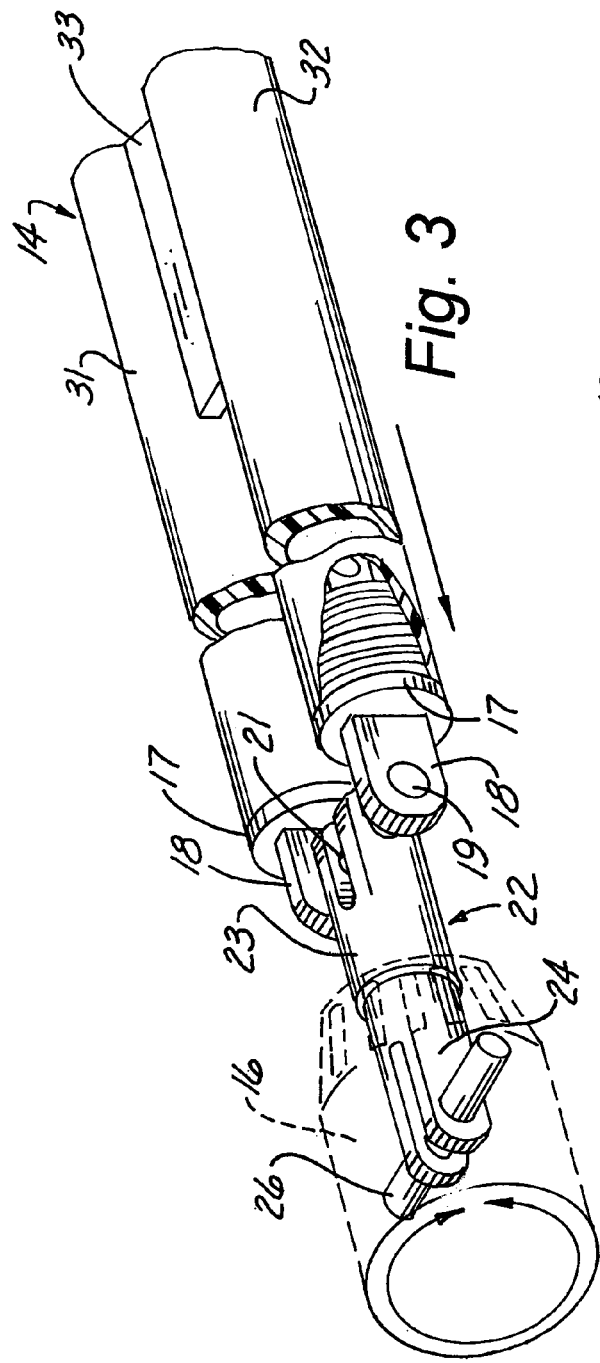
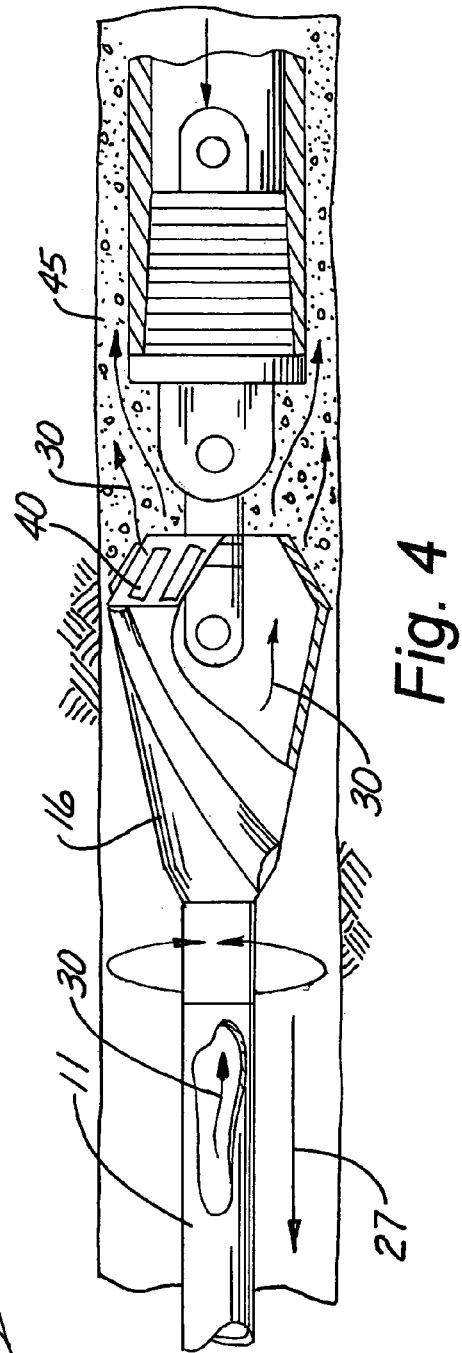

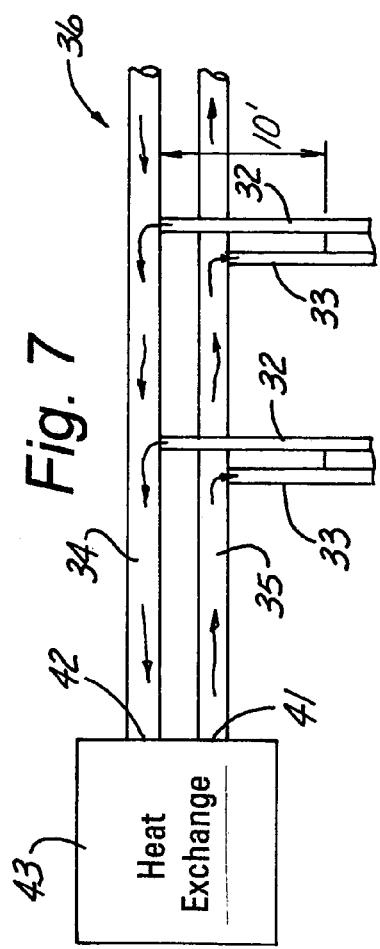
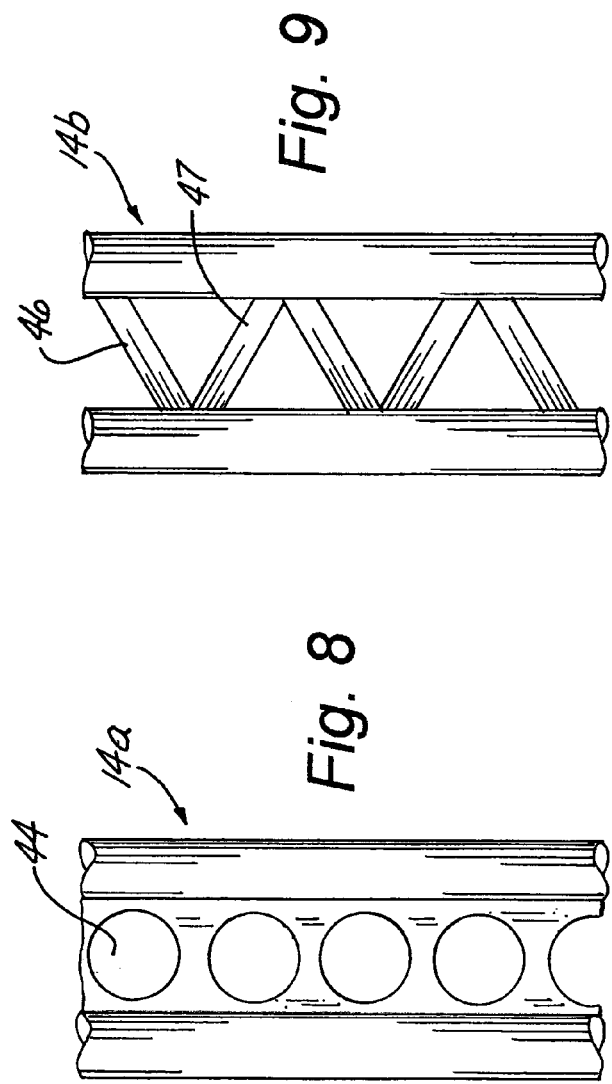

US 7,048,037 B2

GEOTHERMAL HEATING AND/OR COOLING APPARATUS AND METHOD OF USING SAME

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The present invention relates generally to a geothermal heating and/or cooling system and more particularly to one having a first pipe and a second pipe which are integrally connected together and, in a preferred embodiment, one piece by an extruded process.

2. Description of the Related Art

In the field of geothermal heating and/or cooling systems, pipes are connected to the inlet and outlet of a heat exchanger and the pipes are placed underground so as to be able to gather heat from the ground in the winter time so as to be able to heat a house or other structure; and, to remove heat from such building and put it into the ground in the summer time when the house or other structure needs to be cool. Geothermal energy systems are well known, for example, U.S. Pat. No. 6,585,036 to Amerman et al shows a geothermal systems wherein heat transfer pipes are vertically disposed in wells.

Other geothermal heating and/or cooling systems can work very similar to the one shown in U.S. Pat. No. 6,585,036 to Amerman et al but the pipes are disposed in the ground horizontally, well below the surface of the ground, typically at 15 feet or so beneath the surface of the ground. In practice, for each hole that is bored, there is a pair of pipes that are placed into the hole in the ground. One of these pipes in each hole is for receiving heat exchanger fluid from the heat exchanger and the other pipe is for returning the fluid back to the heat exchanger. In order for this system to work efficiently, the pipes need to be separated to prevent the heat from the warmer pipe to be transferred directly across the hole to the pipe with the cooler part of the heat exchanger fluid. In other words, the heat needs to be exchanged with the ground or soil around the hole and not be exchanged with the other parallel pipe in the hole.

It has been determined that a major problem with installation of these pipes in the holes in the ground is that they are not always separated to the extent desired. When this occurs, for example, if both pipes touch one another, then the heat exchange will occur from the fluid in the hotter pipe to the fluid in the cooler pipe and the efficiency of the system will be lowered. In order to overcome this problem, grout has been introduced into the hole for the purpose of trying to separate the pipes and to insulate the pipes from one another in each hole. This solution is not been entirely acceptable because it is not a positive way to separate the pipes from one another.

One solution for keeping the pipes in each hole separated is a spacer or clip, for example as shown in U.S. Pat. No. 6,000,459 to Jeppesen. These clips are used in addition to introducing grout, such as bentonite, to keep the pipes separated and to help prevent heat exchange between the pipes directly from one to the other in the hole in the ground.

Consequently, it will be appreciated that there is a need for an apparatus to permanently and dependably position the geothermal heat exchanger pipes at a predetermined distance apart in a hole of a geothermal heating and/or cooling apparatus wherein the spacer is integral with the pipes.

SUMMARY OF THE INVENTION

The present invention relates to a geothermal apparatus comprising a first pipe for receiving heat exchange liquid therein and a second pipe for receiving a heat exchange liquid therein and having a web integrally connected to each of the first and second pipes, between such pipes, for holding the second pipe at a predetermined distance from the first pipe.

This pair of pipes which are integrally connected are installed in the ground in a hole or bore and then are connected to a heat exchanger having a fluid inlet connected to one of the pipes, a fluid outlet connected to the other of the pipes with the end of the pipes remote from the heat exchanger being connected together.

An object of the present invention is to provide an improved geothermal heating and/or cooling apparatus.

Another object of the present invention is to provide a geothermal pipe apparatus which includes two pipes connected together at one end and having an integral web therebetween to keep the pipes permanently and reliably separated within a hole in the ground.

Other objects, advantages, and novel features of the present invention will become apparent from the following detailed description of the invention when considered in conjunction with the accompanying drawings.

BRIEF DESCRIPTION OF THE DRAWINGS

FIG. 1 is a side elevational view showing how the geothermal pipe of the present invention is installed into the ground;

FIG. 2 is a view of a geothermal apparatus fully installed in a horizontal orientation in the ground;

FIG. 3 is a view of the structure used to pull the pair of pipes which are connected together with an integral web therebetween through a hole in the ground;

FIG. 4 is a view of the pipes actually being pulled through a hole in the ground while at the same time a back reamer is rotating and introducing grout into the hole as the pipes are pulled therethrough;

FIG. 7 is a schematic view of the present invention showing the heat exchanger attached to the manifold and to the pipes of the present invention;

FIG. 8 shows an alternate view of a web having openings therein; and

FIG. 9 shows another alternate structure which has bars formed in a "V" between the pipes to function as a web to keep the pipes spaced apart while in the hole in the ground.

DESCRIPTION OF THE PREFERRED EMBODIMENTS

Figure 5:
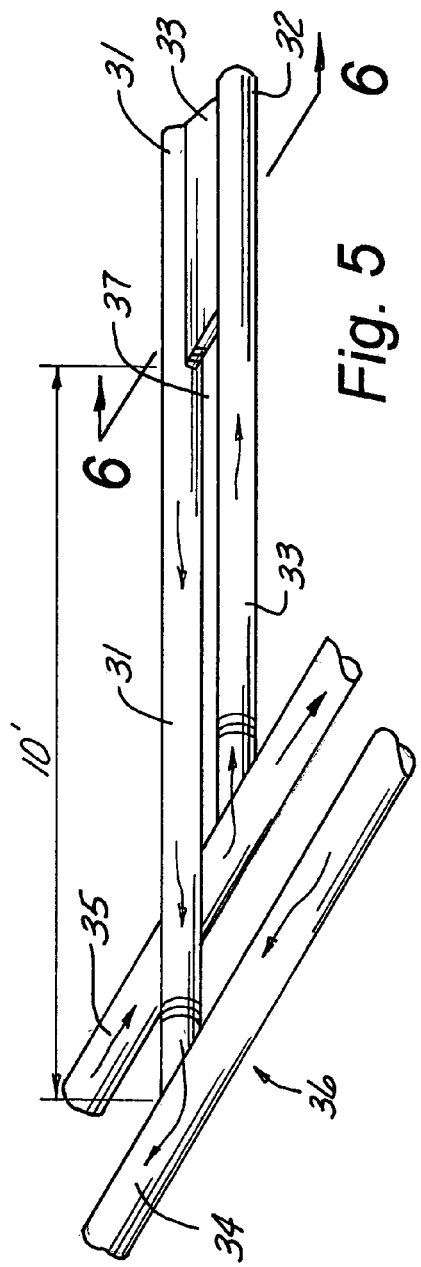
FIG. 5 is a perspective view of a portion the manifold and of the geothermal pipes having a web therebetween.

Referring now to the drawings, wherein like reference numerals designate identical or corresponding parts throughout the several views, FIG. 1 shows a directional drilling machine (10) with sections of pipe (11) extending into the ground (12) and up to where a back reamer and pipe connection structure (13) is connected to a coil (14) of geothermal pipe constructed in accordance with the present invention.

Once the directional drilling machine (10) has the back reamer (16) shown in FIGS. 3 and 4 up out of the ground of the surface of the ground (12) as shown in FIG. 1, then threaded members (17) having one end (18) with a hole (19) therein receives a pin (21) from a swivel connector (22) comprised of a first member (23) rotatably attached to a member (24). This member (24) is attached with a pin (26) to the back reamer (16) as shown in FIGS. 3 and 4 so when the back reamer (16) rotates, the member (24) will rotate with it but the member (22) will not, thereby allowing the member (17) to be pulled in the direction of the arrow (27).

Referring again to FIG. 4, it is noted that the back reamer is rotated by the pipe (11) in the hole and at the same time, grout passes through the pipe (11) in the direction of the arrows (30) and out openings (40) so that the grout (45) extends completely around the pipe (14) as it is being pulled in the direction of the arrow (27) so that once the pipe (14) is in the position shown in FIG. 2, it will be fully surrounded by grout (45) in the hole that it is in.

Referring to FIG. 2, it is noted that the ends of the pipes (31) and (32) are looped with kissed joints (50).

A first pipe (31) and a second pipe (32) shown in FIG. 3 have a web (33) attached therebetween. In a preferred embodiment, these pipes (31), (32) and web (33) are extruded all in one long piece and the ends which are close to the manifold (36) shown in FIGS. 2 and 5 have the web (33) cut out at about ten feet from the ends thereof shown as space (37) in FIG. 5. By having this cut out space (37) wherein the web (33) has been removed, the pipes (31) and (33) can be easily connected respectively to the return pipe (34) and the supply pipe (35).

Figure 6:
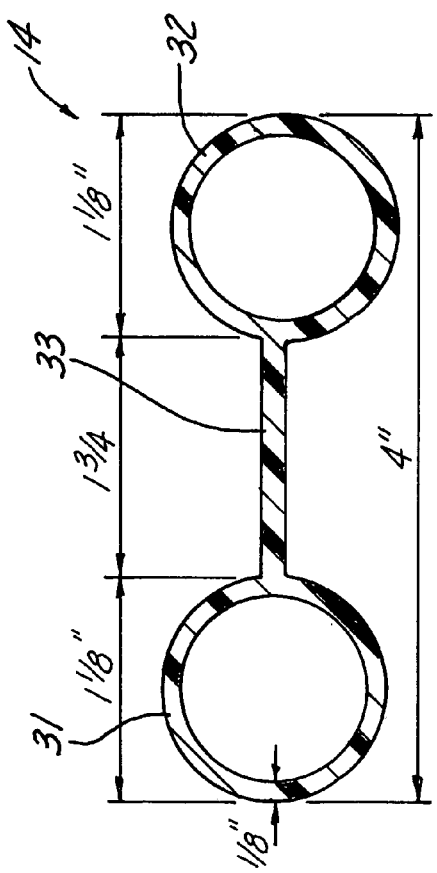
FIG. 6 is a cross sectional view of the present invention taken along line 6—6 of FIG. 5.

Referring to FIG. 6, the ideal dimensions of pipe structure 14 are shown, but it is to be understood that this invention is not limited to this preferred embodiment, but can be constructed with many other related sizes than the ones shown.

As mentioned above, this structure shown in FIG. 6 is most easily manufactured by an extrusion process and a preferred material is polyethylene, although many other materials or combinations of materials can be used instead of polyethylene if desired. Polyethylene just happens to be the material typically used to construct geothermal pipe.

Referring to FIG. 7, it is noted that the manifold including supply pipe (35) and return pipe (34) are connected to the outlet (41) and the inlet (42) of heat exchanger (43).

Referring to FIG. 8, it is noted that this pipe structure (14a) shown can be otherwise identical to the pipe (14) shown in FIGS. 1 and 6, but it has openings (44) in the web for the purpose of saving material in making the pipe (14a) and also for allowing grout to easily find its way between and around the pipe when in the hole in the ground. These openings (44) could be of practically shape imaginable including oval, squares, triangle or combinations thereof.

Referring now to FIG. 9, a geothermal pipe structure (14b) is shown and this geothermal pipe (14b) would be similar to FIG. 6 in cross section, but instead of having a continuous web (33) it would be made with bars (46) going one way and bars (47) going another way so as to use less material, but yet provide positive separation between the supply and return pipes while in the hole of the ground.

Referring again to FIG. 3, it is noted that the threaded devices (17) are just one convenient way of attaching the back reamer (16) to the pipes (31) and (32). These threaded members are merely threaded into the ends of the pipes (31) and (32) so that they can be pulled through the opening or hole in the ground.

In operation of the device shown in FIG. 2, the heat exchanger shown in FIG. 7 is located within the building (51), such as a home. Heat exchanger fluid is circulated through the heat exchanger (43) as shown in FIG. 7, out the outlet (41) into a manifold pipe (35) which is connected to pipe (33). This heat exchanger fluid can be, for example, eighty percent (80%) water and twenty percent (20%) antifreeze. After the heat exchanger fluid extends down through each of the pipes (33), it is returned through pipes (32) to return pipe (34) and into the inlet (42) of heat exchanger (43). In the winter time, the pipes (33) and (35) will contain relatively cool fluid and heat will be absorbed thereby from under the ground so that such fluid will be warmer as it returns through pipes (32) and (34) to the heat exchanger 43. Of course the heat exchanger 43 will take the heat in the wintertime and move it into the house or other building to be heated. The reverse is, of course, true in the summer time when it is desired to cool the home or other building.

Obviously many modifications and variations of the present invention are possible in light of the above teachings. For example, while a horizontal ground coupled heat pump system is shown, it can be a vertical ground system instead. It is, therefore, to be understood that within the scope of the appended claims, the invention may be practiced otherwise than as specifically described.

The invention claimed is:

1. A geothermal heating and/or cooling system comprising:
    a first pipe disposed underground and having a first end and a second end;
    a second pipe disposed underground and having a first end and a second end;
    the first end of the first pipe being in fluid communication with the first end of the second pipe;
    a heat exchanger having a fluid inlet and a fluid outlet;
    the second end of the first pipe being in fluid communication with the outlet of the heat exchanger and the second end of the second pipe being connected to the inlet of the heat exchanger; and
    said first and second pipes are spaced apart by a predetermined distance and are integrally attached by an integral attachment to each other along the at least a portion length thereof.

2. The geothermal heating and/or cooling system of claim 1 wherein the first pipe, second pipe, and the integral attachment are one piece.

3. The geothermal heating and/or cooling system of claim 2 wherein said first pipe, second pipe, and integral attachment is an extruded product.

4. The geothermal heating and/or cooling system of claim 3 wherein the first and second pipes and the integral attachment are extruded from a material comprising polyethylene.

5. The geothermal heating and/or cooling system of claim 4 wherein the integral attachment has openings therein.

6. The geothermal heating and/or cooling system of claim 4 wherein the integral attachment is continuous between the first and second pipes for a substantial distance of the first and second pipes.

7. The apparatus of claim 1 wherein at least a portion of the first pipe, second pipe and integral attachment are disposed underground.

8. Geothermal apparatus comprising:

a first pipe for receiving a heat exchange fluid therein;

a second pipe for receiving a heat exchange fluid therein;

a web integrally connected to each of the first and second pipes for holding the second pipe a predetermined distance from the first pipe; and wherein at least a portion of each of the first pipe, the second pipe and the web are disposed underground at said predetermined distance apart.

9. The apparatus of claim 8 wherein the first and second pipes and the web are extruded from a material comprising polyethylene.

10. The apparatus of claim 8 wherein the web has openings therein.

11. The apparatus of claim 8 wherein the web is continuous.

12. The apparatus of claim 8 wherein said first and second pipes are operably attached to a heat exchanger.

13. The apparatus of claim 8 wherein the first pipe, second pipe and web are constructed of a material flexible enough to be rolled onto or off of a reel.

14. The apparatus of claim 8 wherein the first pipe, second pipe and web are disposed on a reel.

* * * * *